(12) United States Patent
Burcham

(10) Patent No.: US 8,235,763 B1
(45) Date of Patent: Aug. 7, 2012

(54) FIGHTING PURR GAME CALL

(75) Inventor: Gregory S. Burcham, Hartselle, AL (US)

(73) Assignee: EBSCO Industries, Inc., Birmingham, AL (US)

( * ) Notice: Subject to any disclaimer, the term of this patent is extended or adjusted under 35 U.S.C. 154(b) by 169 days.

(21) Appl. No.: 12/827,955

(22) Filed: Jun. 30, 2010

Related U.S. Application Data

(60) Provisional application No. 61/266,506, filed on Dec. 3, 2009, provisional application No. 61/349,816, filed on May 28, 2010.

(51) Int. Cl.
 *A63H 5/00* (2006.01)
 *G10D 13/08* (2006.01)
(52) U.S. Cl. ............................ 446/397; 446/421; 84/404
(58) Field of Classification Search .................. 446/397, 446/418, 420–421; 84/402, 427.4
 See application file for complete search history.

(56) References Cited

U.S. PATENT DOCUMENTS

| | | | |
|---|---|---|---|
| 2,770,159 A * | 11/1956 | Kato | 84/404 |
| 4,041,639 A | 8/1977 | Funk | |
| 4,606,733 A | 8/1986 | Willis | |
| 4,758,197 A * | 7/1988 | Lee | 446/213 |
| 4,875,885 A * | 10/1989 | Johnson | 446/189 |
| 5,562,521 A | 10/1996 | Butler et al. | |
| 6,669,528 B2 | 12/2003 | Kaelin | |
| 6,872,118 B1 | 3/2005 | Bishop | |
| 7,789,727 B2 * | 9/2010 | Chernick et al. | 446/397 |

* cited by examiner

*Primary Examiner* — Kien Nguyen
(74) *Attorney, Agent, or Firm* — Smith Gambrell & Russell LLP

(57) ABSTRACT

A turkey game call includes a housing assembly and a striker assembly to generate fighting purr sounds. The housing assembly may include a base, a wall surrounding the periphery of the base, and a beam extending across the base. The striker assembly may include a control handle, a central hub connected to said handle, and a pair of striker plates connected to said central hub. Two posts are connected to the base proximate said striker plates, with each striker plate engaging one of said corresponding posts to generate the fighting purr sounds.

18 Claims, 19 Drawing Sheets

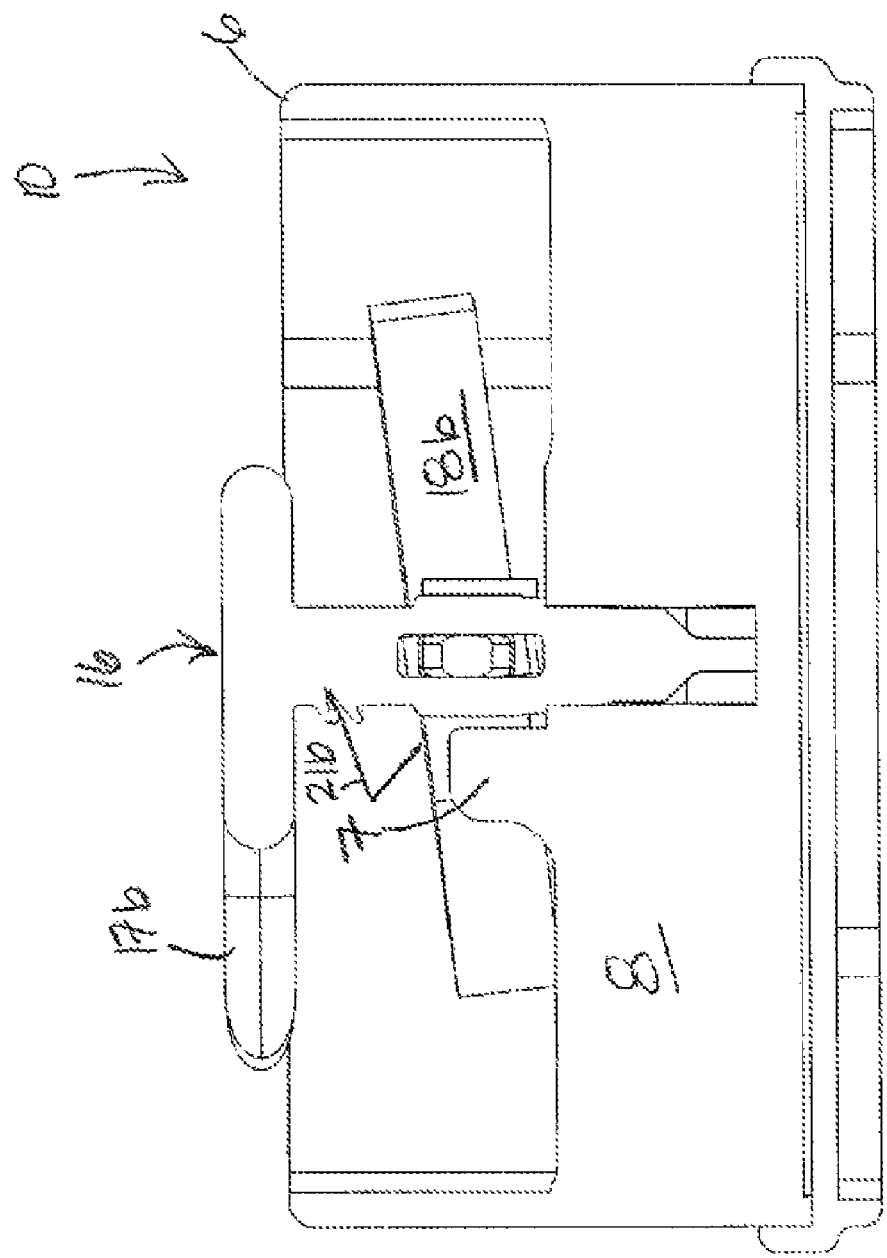

ded upon and
FIGHTING PURR GAME CALL

CROSS REFERENCE TO RELATED PATENT APPLICATIONS

This application claims priority from U.S. Provisional Application Ser. No. 61/266,506, filed on Dec. 3, 2009, and U.S. Provisional Application Ser. No. 61/349,816, filed on May 28, 2010, each said application being relied upon and incorporated herein by reference in its entirety.

BACKGROUND OF THE INVENTION

1. Field of the Invention

A game call is described herein, and more specifically to a fighting purr game call utilizes opposing striker plates mounted to a central rotational hub via rubber torsion arms to generate a sound similar to the mating, gathering, and feeding calls of wild turkeys. This game call provides the user with the ability to mimic the sound of fighting turkeys with one call and the option of doing so with one hand.

2. Description of the Prior Art

Turkeys (both gobblers and jakes) are known to produce a loud, aggressive purr as they posture to fight for various reasons, such as dominance and breeding rights. Hens will also purr aggressively when they are upset and looking for a fight. It is against the nature of a gobbler to come to a hen, but it is in his nature to come to a fight. As a result, the aggressive purrs that are created with turkey calls are so effective that it will make turkeys three years old and older come into gun range.

In order to create the fighting sound to attract turkeys, outdoorsmen have learned how to attract gobblers by generating sounds to mimic the purring sounds made by turkeys when they are fighting. That is, outdoorsmen will obtain a couple of push-pull turkey calls and manipulate both calls independently to produce the sound of two gobblers fighting.

To generate the desired sound using a push-pull game call, there is the push stroke moving a striker or striking plate against a striking block or peg, which makes the sound similar to that made by a turkey, and then the return stroke to the initial position, which makes no sound. Thus, to create a fighting purr sound with this type of game call would require the outdoorsman to hold a first push-pull game call in one hand and a second push-pull game call in the other hand, with the user alternating sound strokes in the first and second game calls to achieve the rapid fire sound of the fighting birds. That is, while the first game call is making the return stroke (no sound), the second game call is making the push stroke (sound) and vice versa, to attract the desired birds. The user is able to adjust the frequency, speed and strength of the engagement between the striker and the striking board in both the first and second game calls held in each hand.

In another embodiment shown in U.S. Pat. No. 6,872,118 to Bishop, a push-pull design is incorporated in the bottom of the slate call to create the desired sound. However, the game call described therein is burdensome, requiring the outdoorsman to operate simultaneously the single-handed use assembly with one hand and the striking stick device with the other hand. That is, to operate the striking plate member, the striking stick is held in one hand and the apparatus is held in the other. Bottom side of striking stick is brought into contact with striking plate of striking plate member in short strokes to produce the sounds. This requires that the user to operate the game call with both hands with some level of skill to generate to purr with the slate portion.

BRIEF SUMMARY OF THE INVENTION

A turkey game call is described herein for simply and efficiently generating sounds to mimic the purring noises made by turkeys when they are fighting. The game call includes a housing assembly and a striker assembly. The housing assembly may include a base, a wall surrounding the periphery of the base, and a beam extending across the base. The striker assembly may include a control handle, a central hub connected to said handle, and a pair of striker plates connected to said central hub. Two posts are connected to the base proximate said striker plates, with each striker plate engaging one of said corresponding posts to generate fighting purr sounds.

In operation, the user will engage one of the two flanges on the control handle to rotate the central rod in the desired direction. When the user engages first flange, the bottom surface of the first striker plate will engage the tip surface of the first striking post in direction to generate a first sound while the second striker plate will silently recover. The striker assembly will rotate until the user stops the motion or the mounting plates or connecting arms engage the stop tab. The stop tab creates a natural stop for the striker assembly to keep the user from rotating too far and to direct striker assembly back to generate the sound of two gobblers. That is, once the motion is complete, the user will reverse the direction of rotation of the control handle to generate a second sound with the second striker plate. That is, the user will engage the second flange so that the second striker plate will move in direction and the bottom surface of the second striker plate will rub against the second striking post and create a second sound, while the first striker plate will silently recover. Again, the striker assembly will rotate until the user stops the motion or the mounting plates or connecting arms engage the stop tab. As a result, the outdoorsman is able to create continuous opposition purr sounds with the first and second striker plates and striking blocks while utilizing only one game call, and these sounds can be generated by the user with a single hand. That is, the user can put the call on the ground, on the user's knee, or a similar stable surface, and then use the game call to call turkeys with one hand and a firearm in the other hand.

BRIEF DESCRIPTION OF THE DRAWINGS

FIG. 23 is a second side sectional view of the game call.

DETAILED DESCRIPTION OF THE INVENTION

Figure 1:
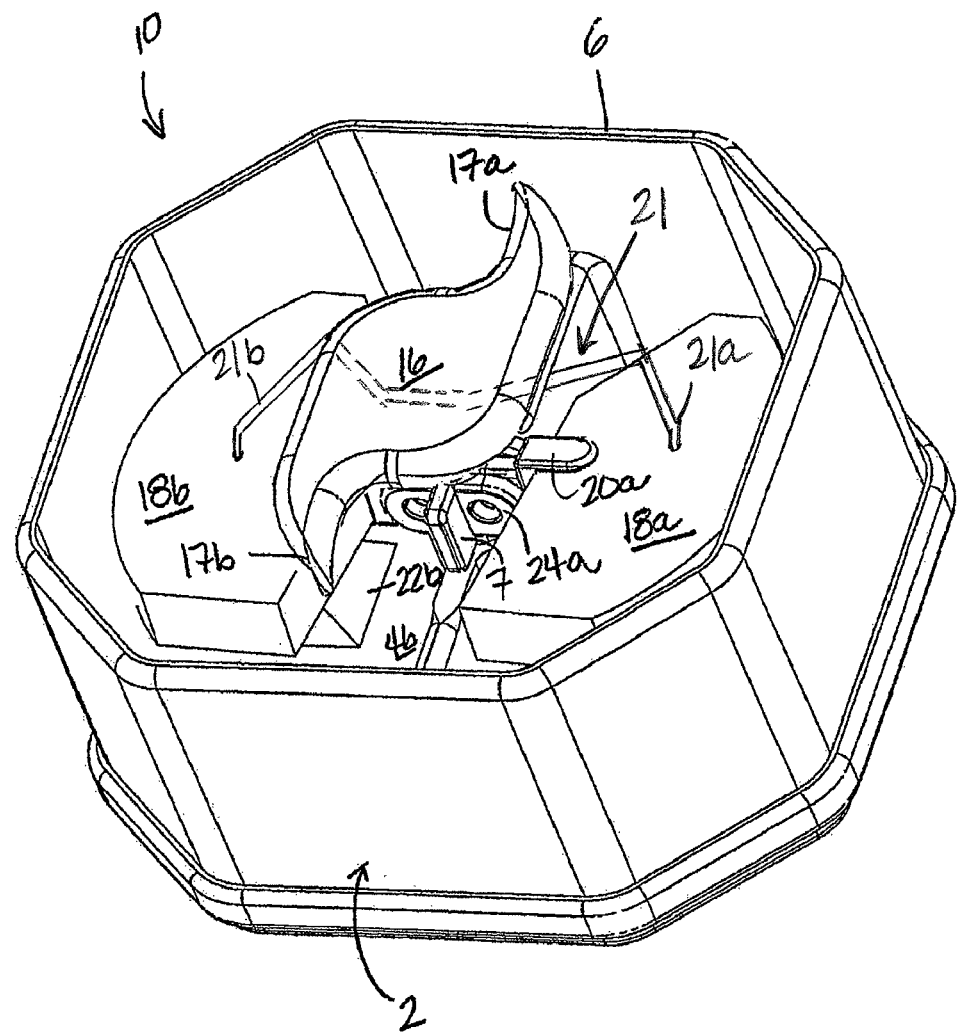
FIG. 1 is a first perspective view of the game call.

A game call 10 for attracting turkeys by generating fighting purr sounds is illustrated in the attached figures. In particular, the game call 10 is simply used and requires little more skill than a standard push-pull game call to generate a fighting purr sound to attract the desired wildlife, and can be operated using one hand by an outdoorsman. Looking to FIGS. 1-23, the game call 10 includes a housing assembly 2 and a striker assembly 12. The striker assembly 12 engages the housing assembly 2 to generate the desired sounds described herein.

Referring now to FIGS. 1, 2 and 10-23, the housing assembly 2 includes a base 4 having a defined perimeter. A wall 6 may extend around the perimeter of the base 4 to define a void or open area above the base 4. A central support shaft or beam 8 may further extend between opposite sides of the wall 6 proximate the base 4 to substantially divide the housing 2 into two sections. A support cylinder 9 is further defined midway along the support shaft or beam 8 to receive and to support the striker assembly 12 as described herein. In the embodiment illustrated, the cylinder 9 has a central aperture 9a extending therethrough, and the cylinder 9 is positioned substantially midway along the support shaft 8 centrally with respect to the surrounding wall 6.

The housing assembly 2 may additionally include one or more raised stop tabs 7 that extend upward from the shaft 8. In the embodiment illustrated in FIGS. 1, 21, and 23, the stop tab 7 is positioned adjacent the support cylinder 9 that will receive the striker assembly 12. The stop tab 7 is positioned proximate the support cylinder 9 to limit the rotating movement of the striker assembly 12 with respect to the housing 2 and direct the user to stop one movement and begin an opposite movement of the striker assembly 12. The stop tab 7 will therefore assist in controlling the sounds produced by the call 10, as described in further detail herein.

The base board 4 may include one or more boards as desired by the user, with the base board 4 essentially dividing the base board into two base sections 4a, 4b separated by the support shaft 8. In the embodiment shown in FIGS. 11, 12 and 15, the base board 4 includes two boards that form the sections 4a, 4b. The base 4 is affixed to a lower portion of the wall 6 between the support shaft 8 and the walls 6 of the housing 2. A pair of striking blocks or posts 22 are connected to the base 4, with the first striking block 22a being connected to the first section 4a of the sound board 4 via a conventional connection means (such as by a mechanical screw or by glue) and the second striking block 22b being connected to the second section 4b of the sound board 4, also via a conventional connection means (such as by a mechanical screw or by glue).

As noted above, in addition to the housing assembly 2, the game call 10 includes the striker assembly 12 (as illustrated in FIGS. 3 through 9). The striker assembly 12 includes a center support rod 14 (also referred to as a rotor or hub) having a distal end 14a and a proximal end 14b. The distal end 14a is designed with an end tapering to a point that is able to engage and traverse the length of cylinder 9 defined in the central shaft 8 of the housing 2.

Figure 2:
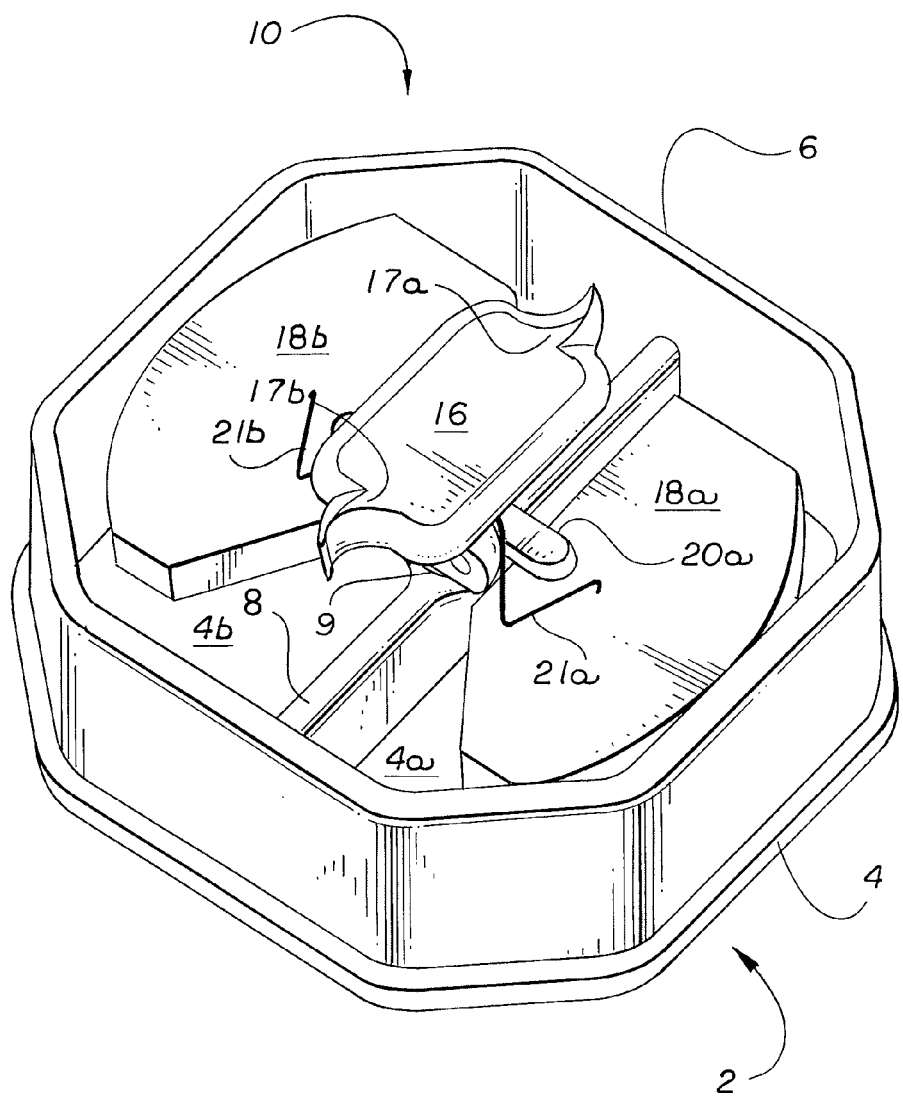
FIG. 2 is a second perspective view of the game call.
Figure 3:
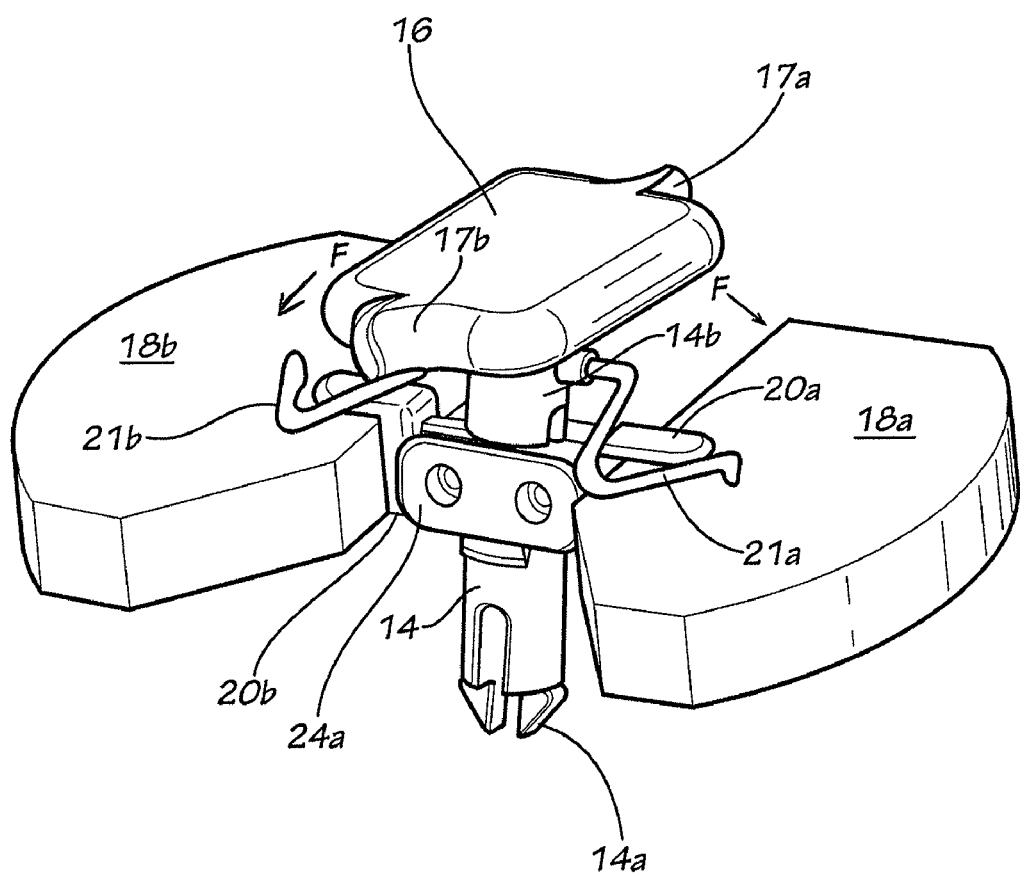
FIG. 3 is a perspective view of the striker assembly.
Figure 4:
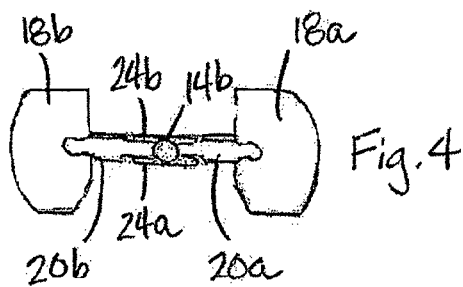
FIGS. 4-9 are various illustrations of portions of the game call.
Figure 5:
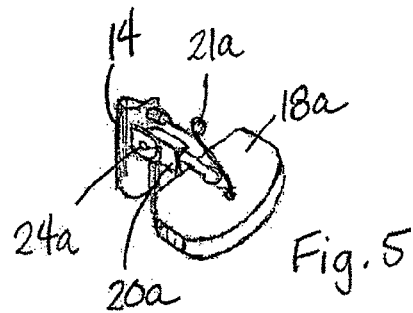
Figure 6:
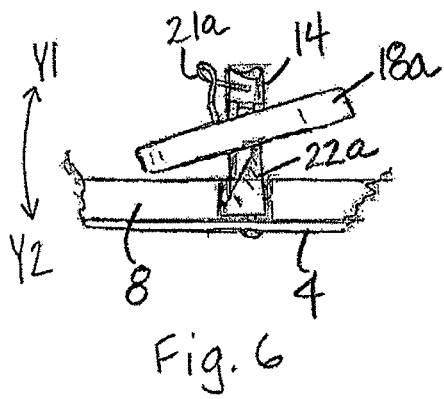
Figure 7:
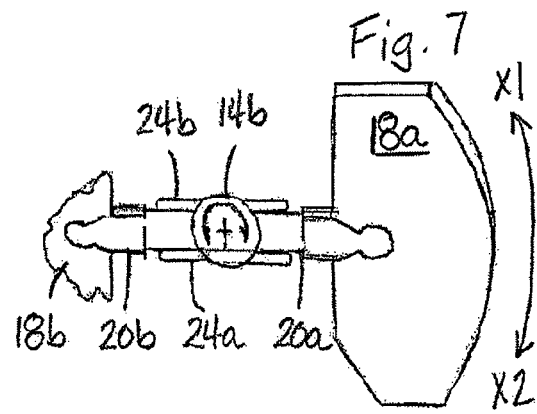
Figure 8:
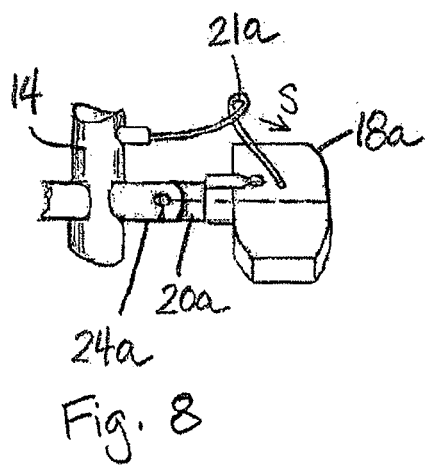
Figure 9:
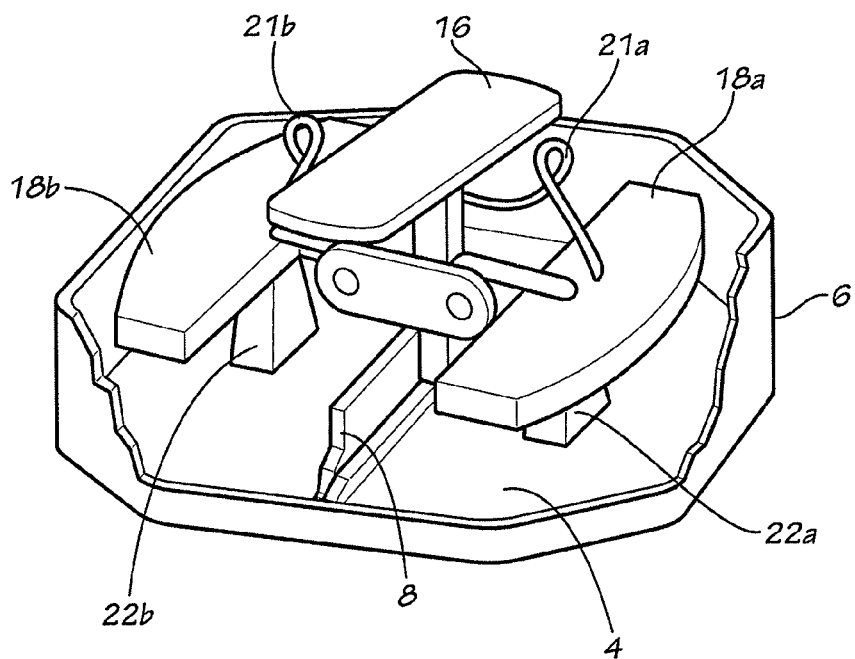
Figure 10:
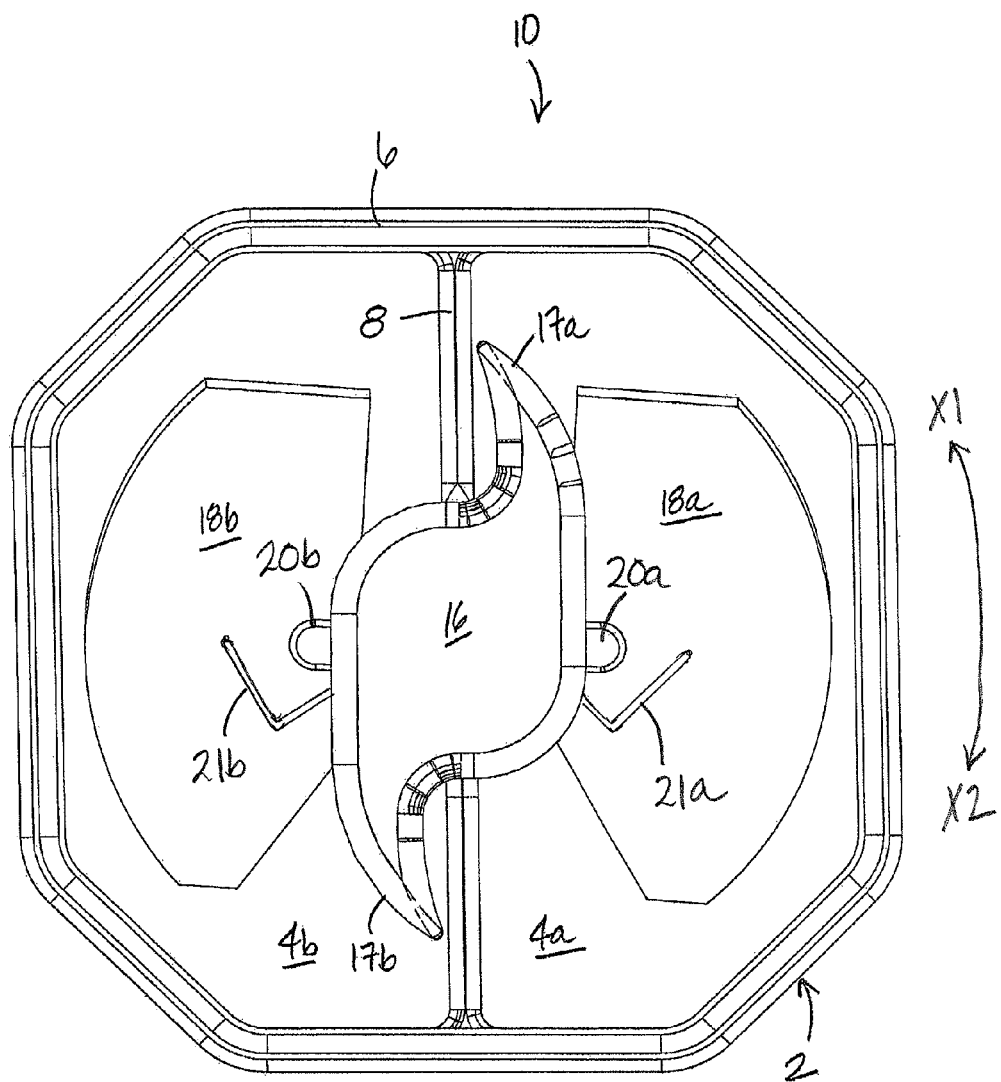
FIG. 10 is a top plan view of the game call.
Figure 11:
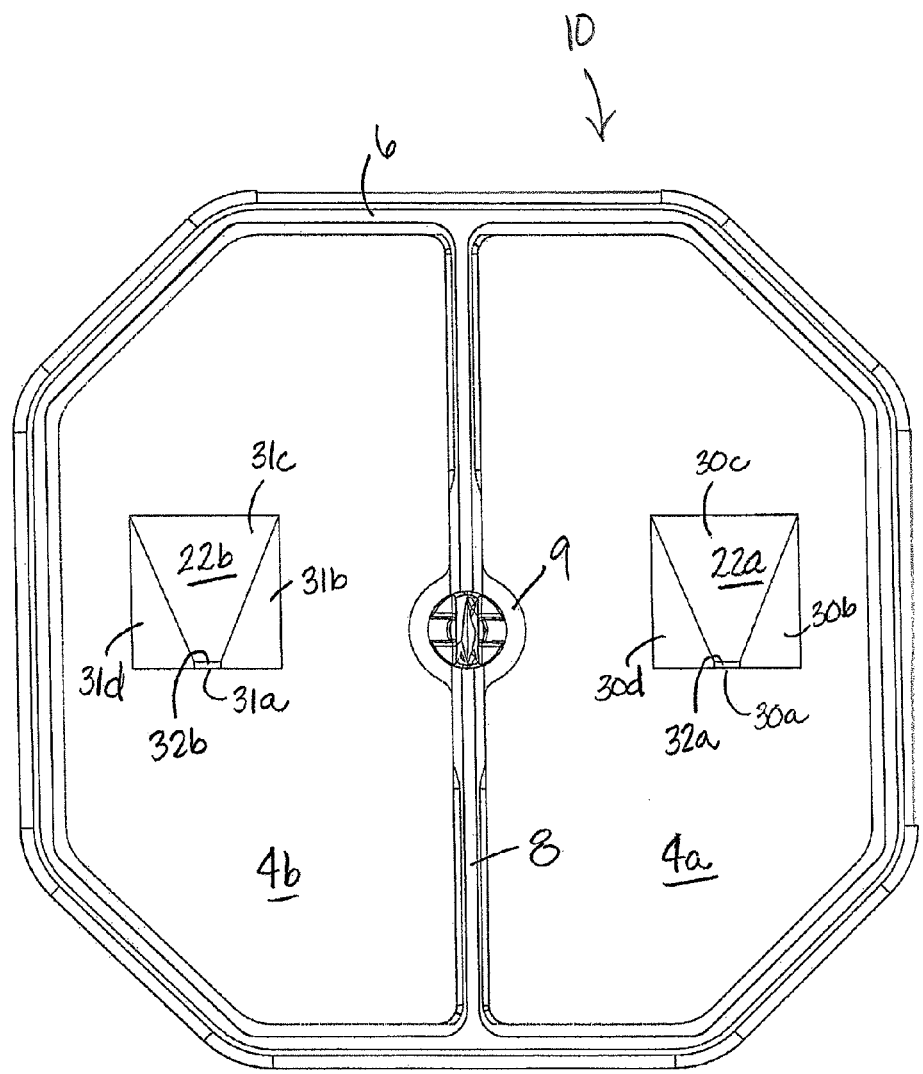
FIG. 11 is a top plan view of a section of the game call.
Figure 12:
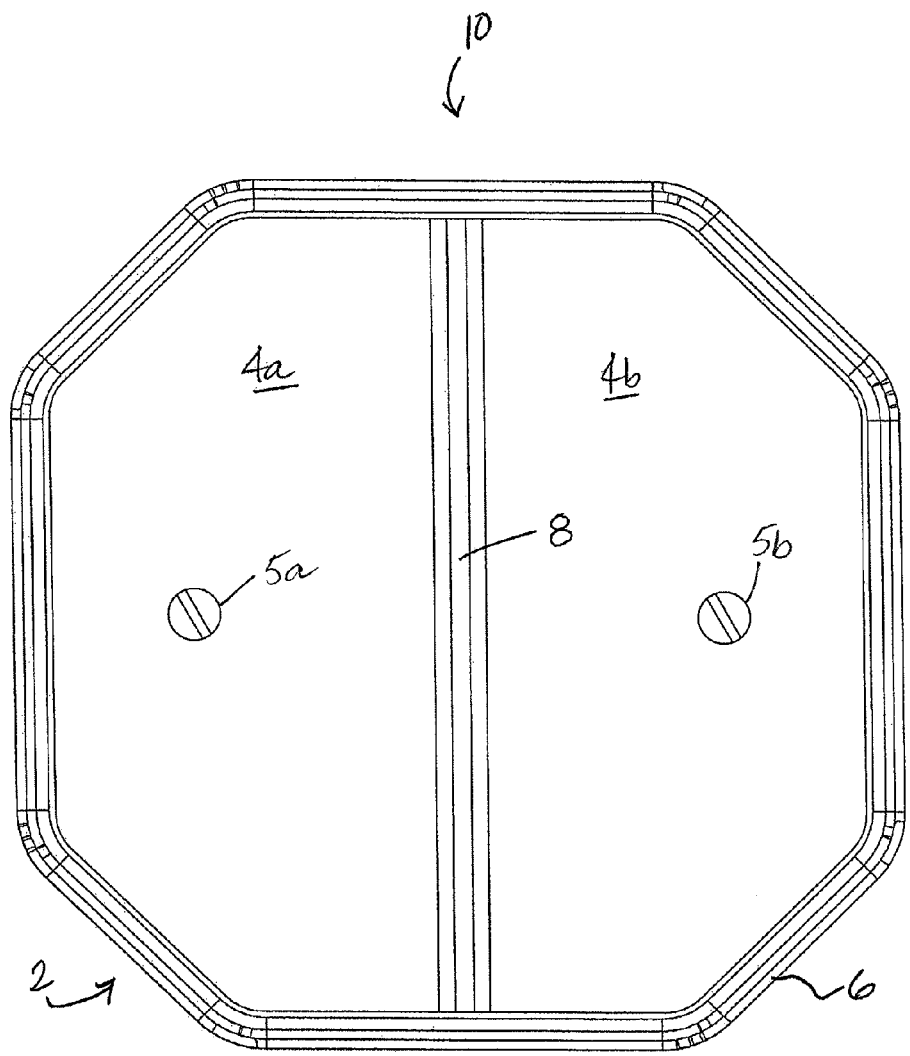
FIG. 12 is a bottom view of the game call.
Figure 13:
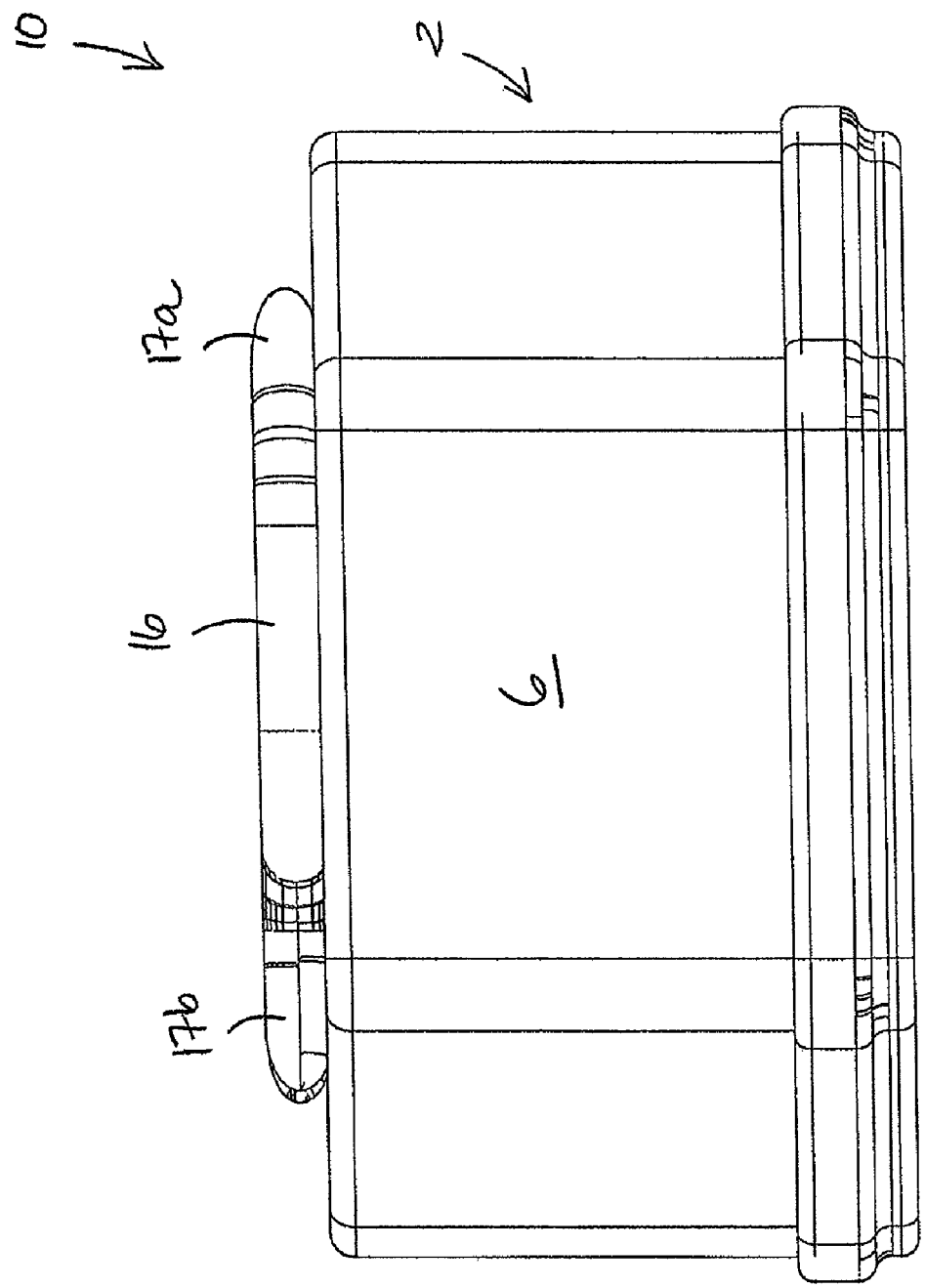
FIG. 13 is a side elevational view of the game call.
Figure 14:
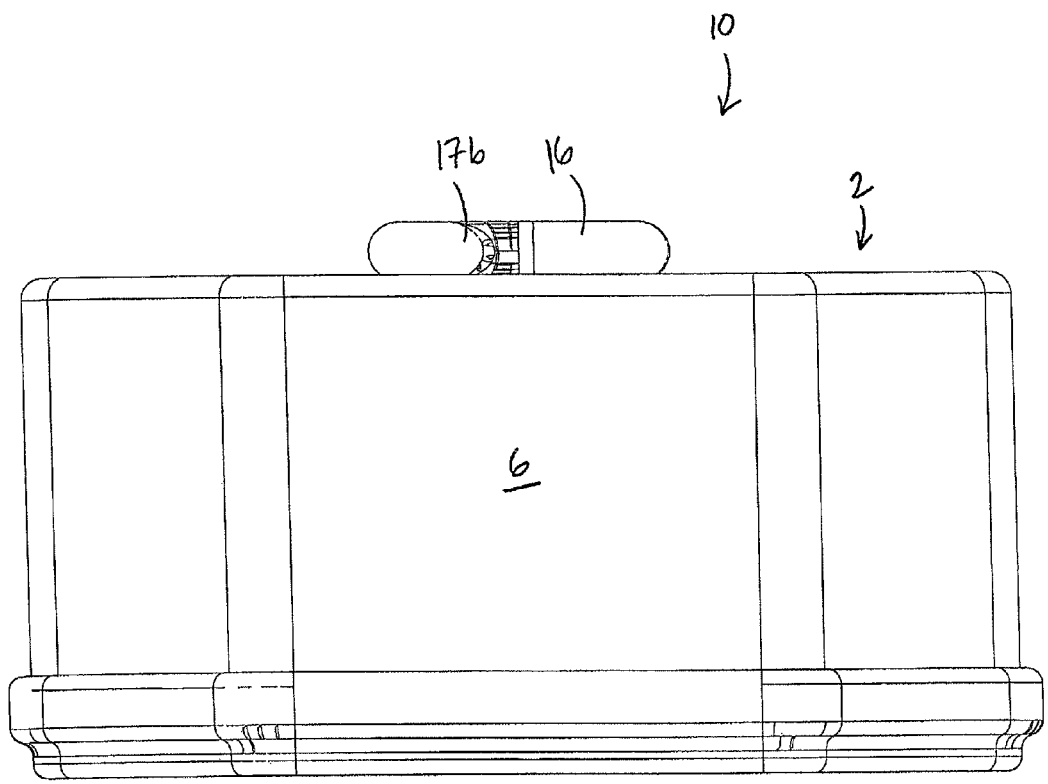
FIG. 14 is a front elevational view of the game call.
Figure 15:
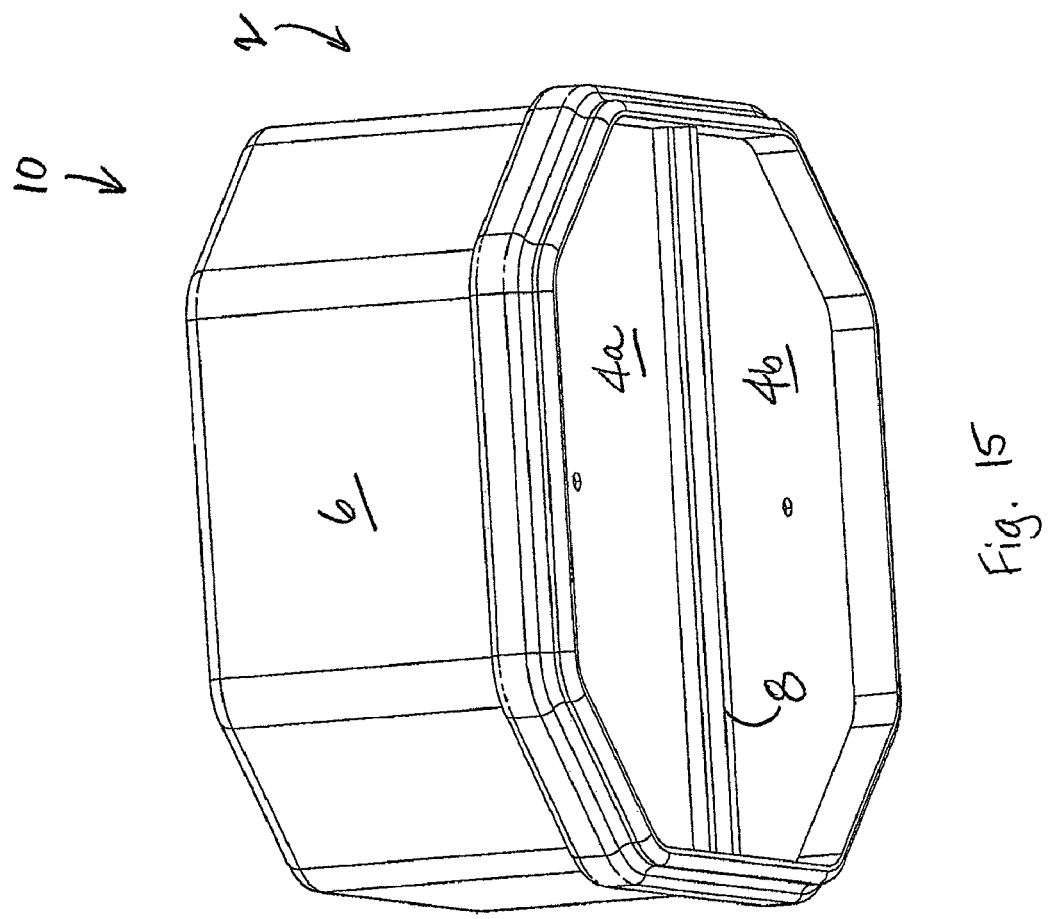
FIG. 15 is a bottom perspective view of the game call.
Figure 16:
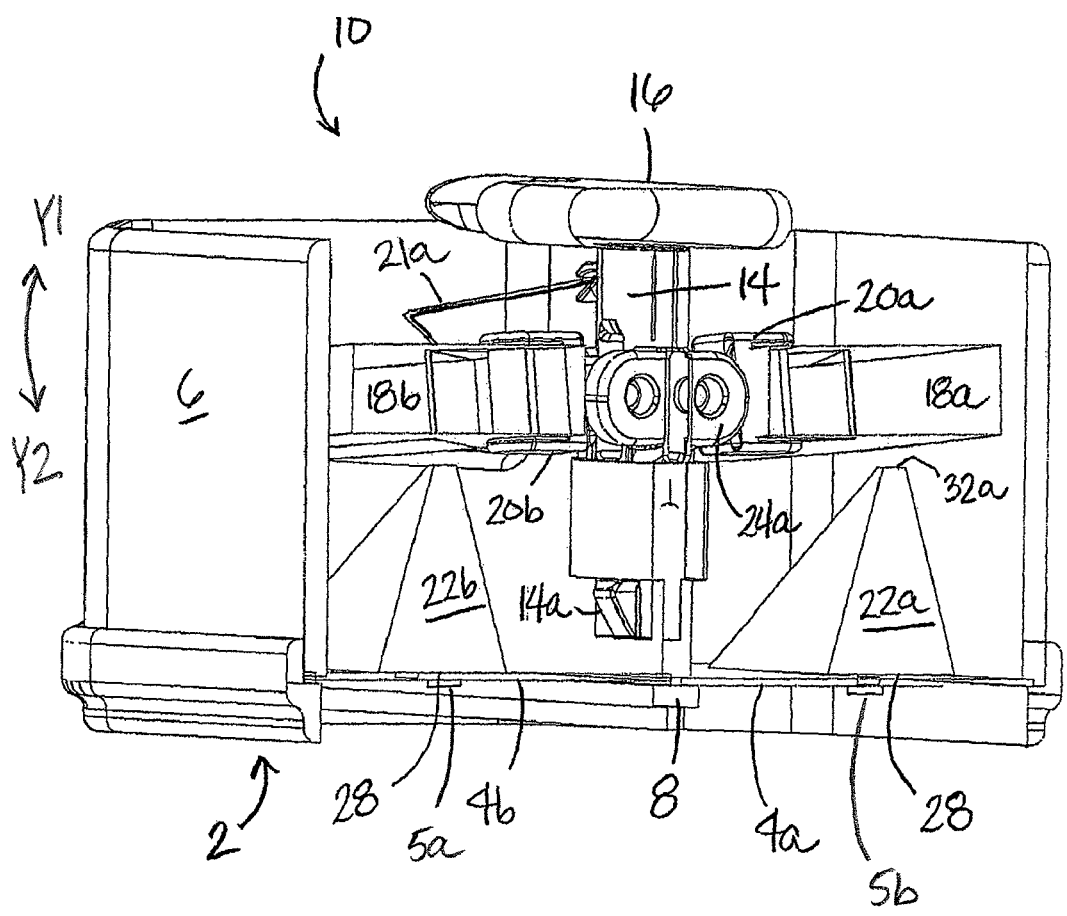
FIG. 16 is a perspective sectional view of the game call.
Figure 17:
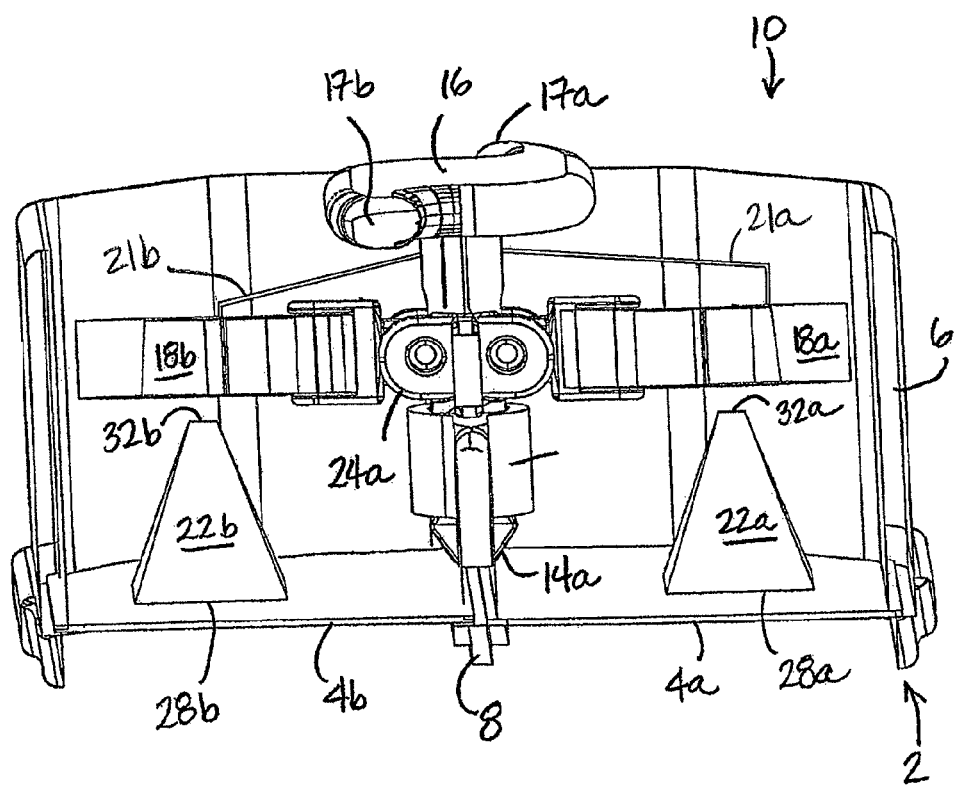
FIG. 17-20 are a side sectional views of the game call.
Figure 18:
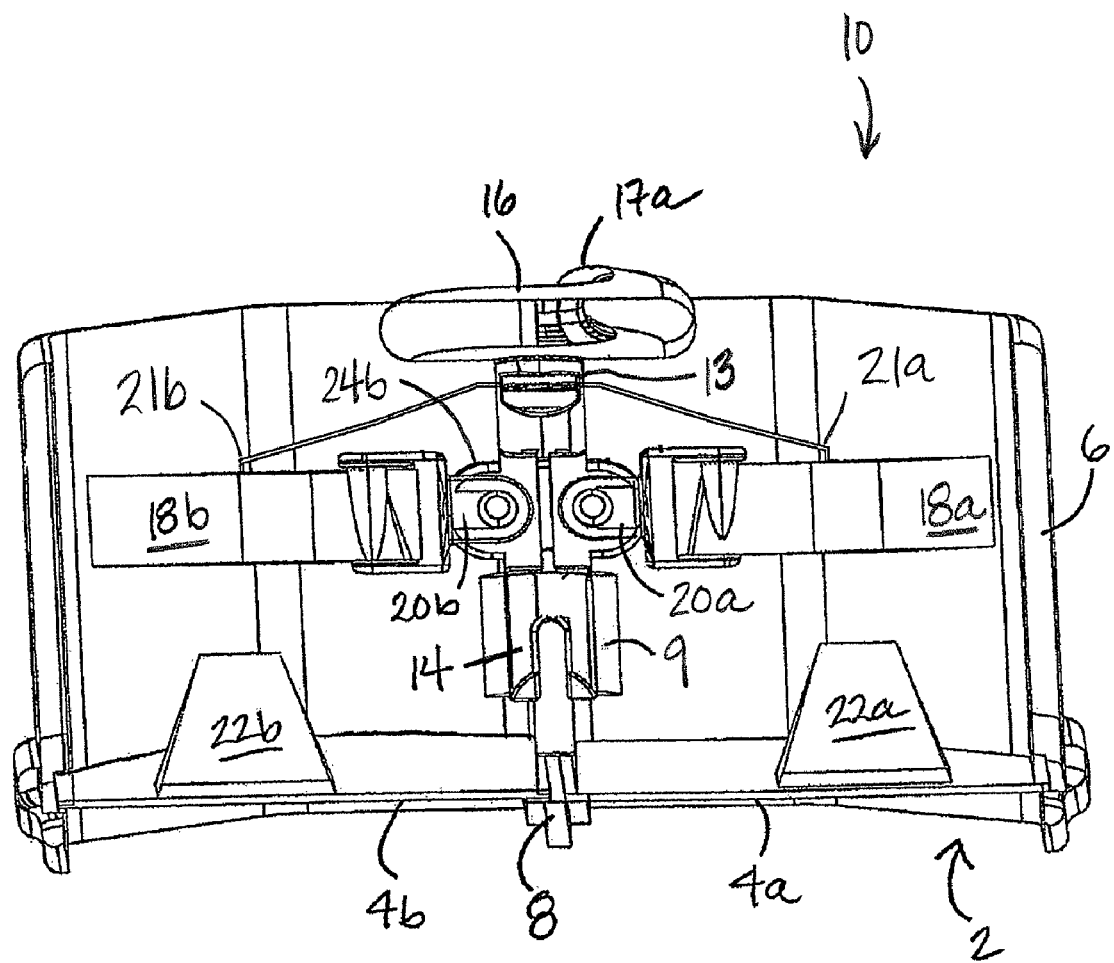
Figure 19:
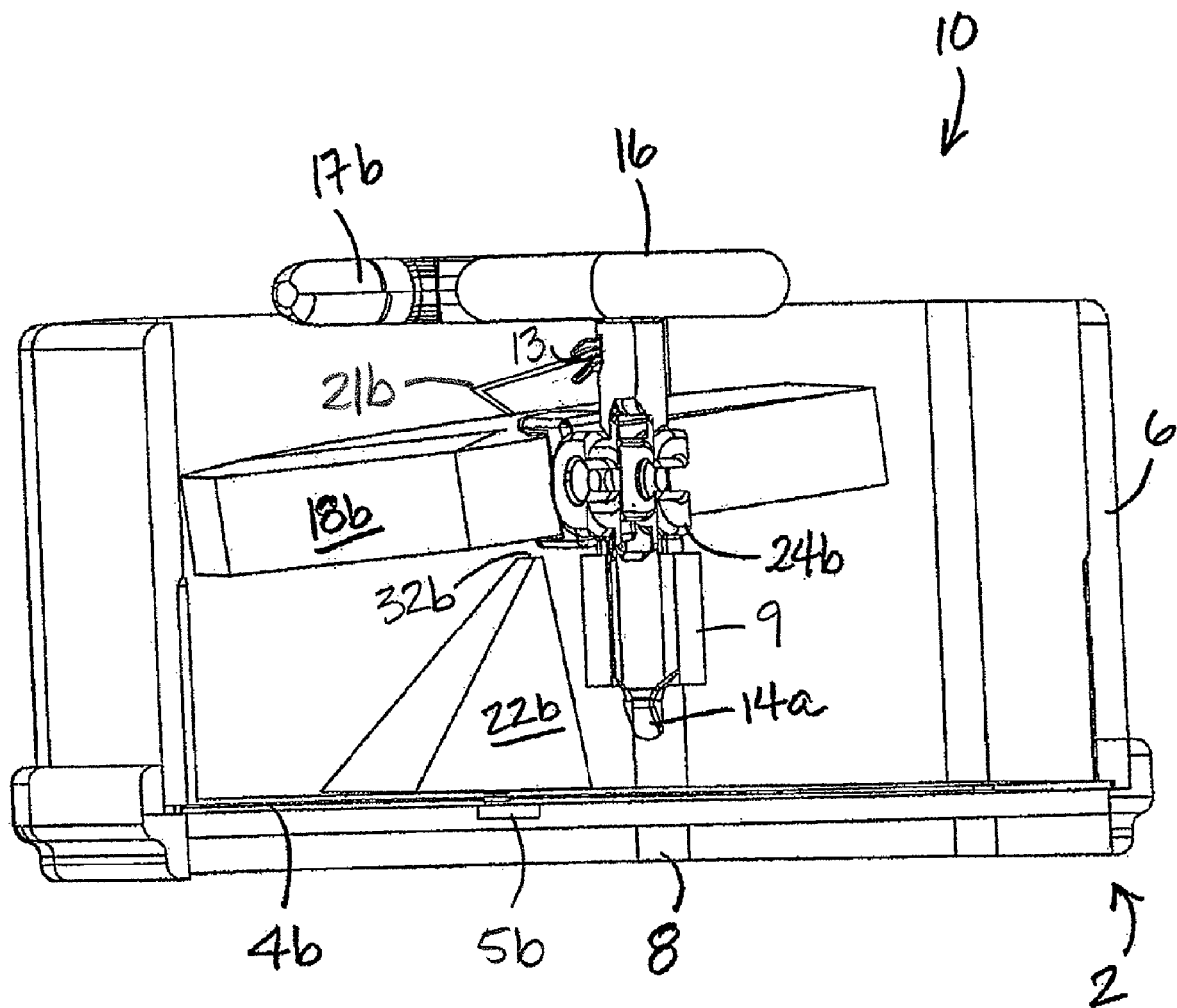
Figure 20:
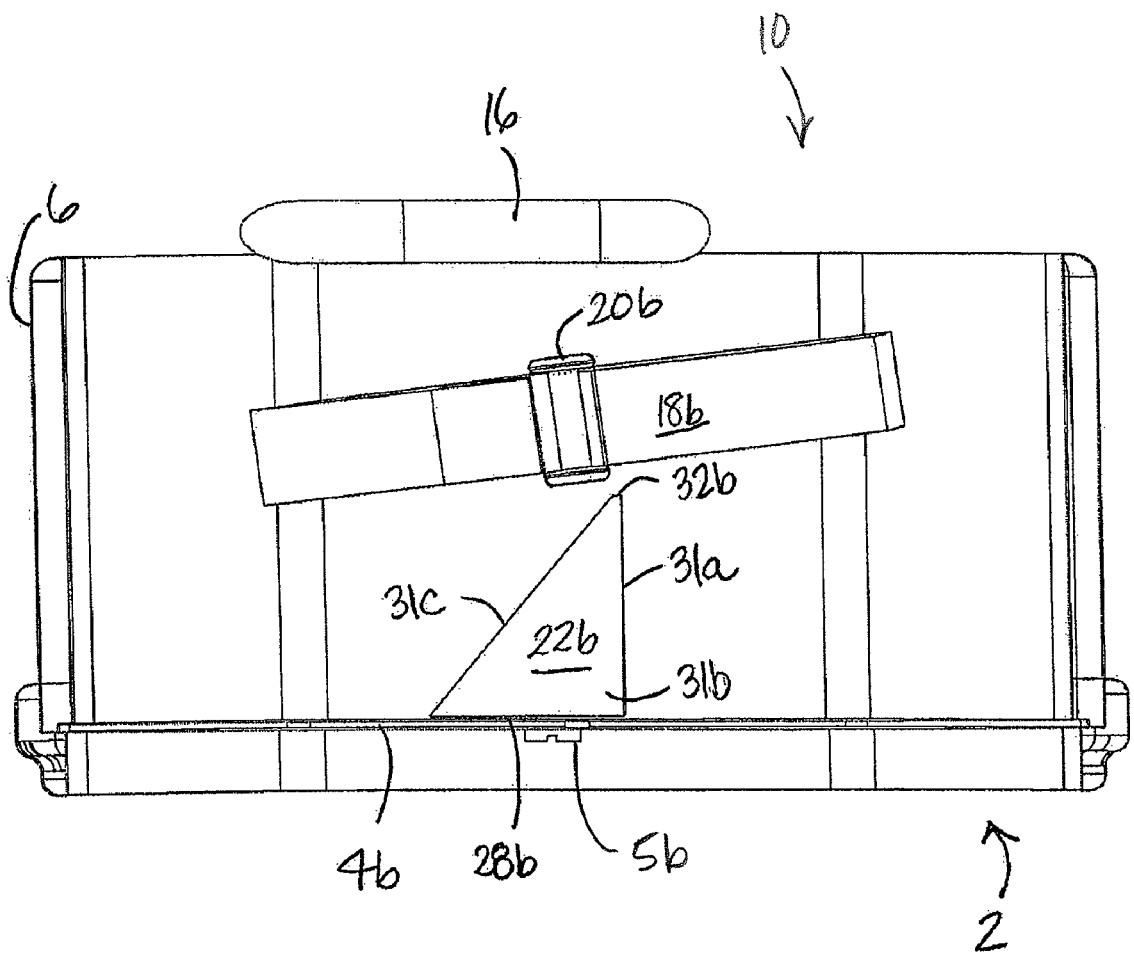
Figure 21:
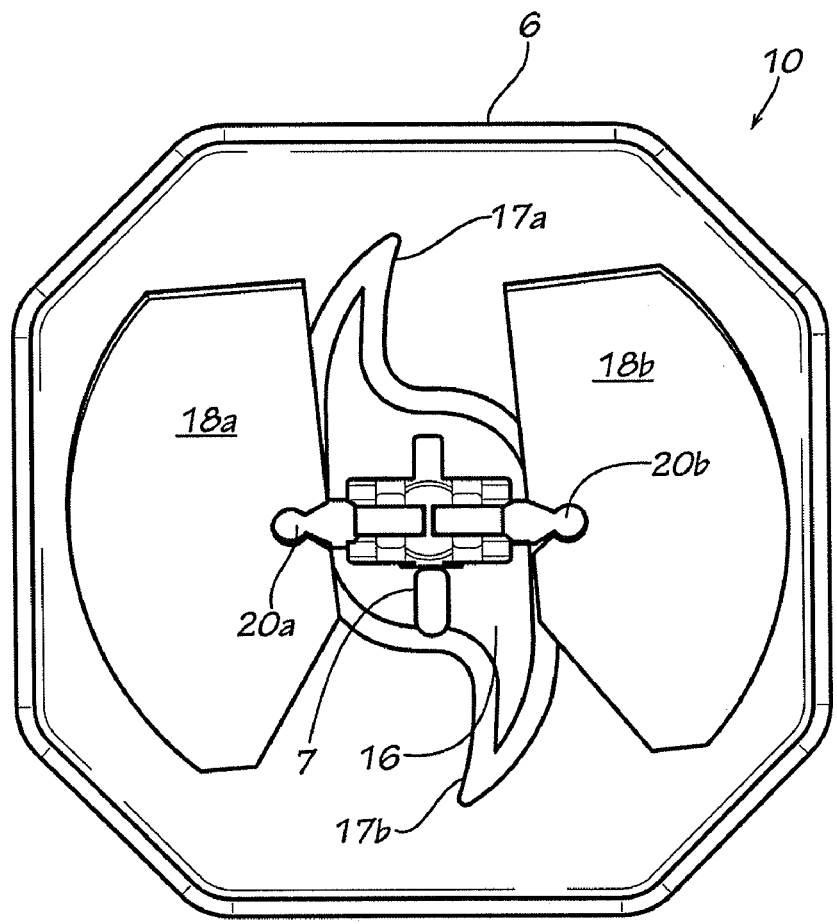
FIG. 21 is a bottom sectional view of the game call looking to the control handle.
Figure 22:
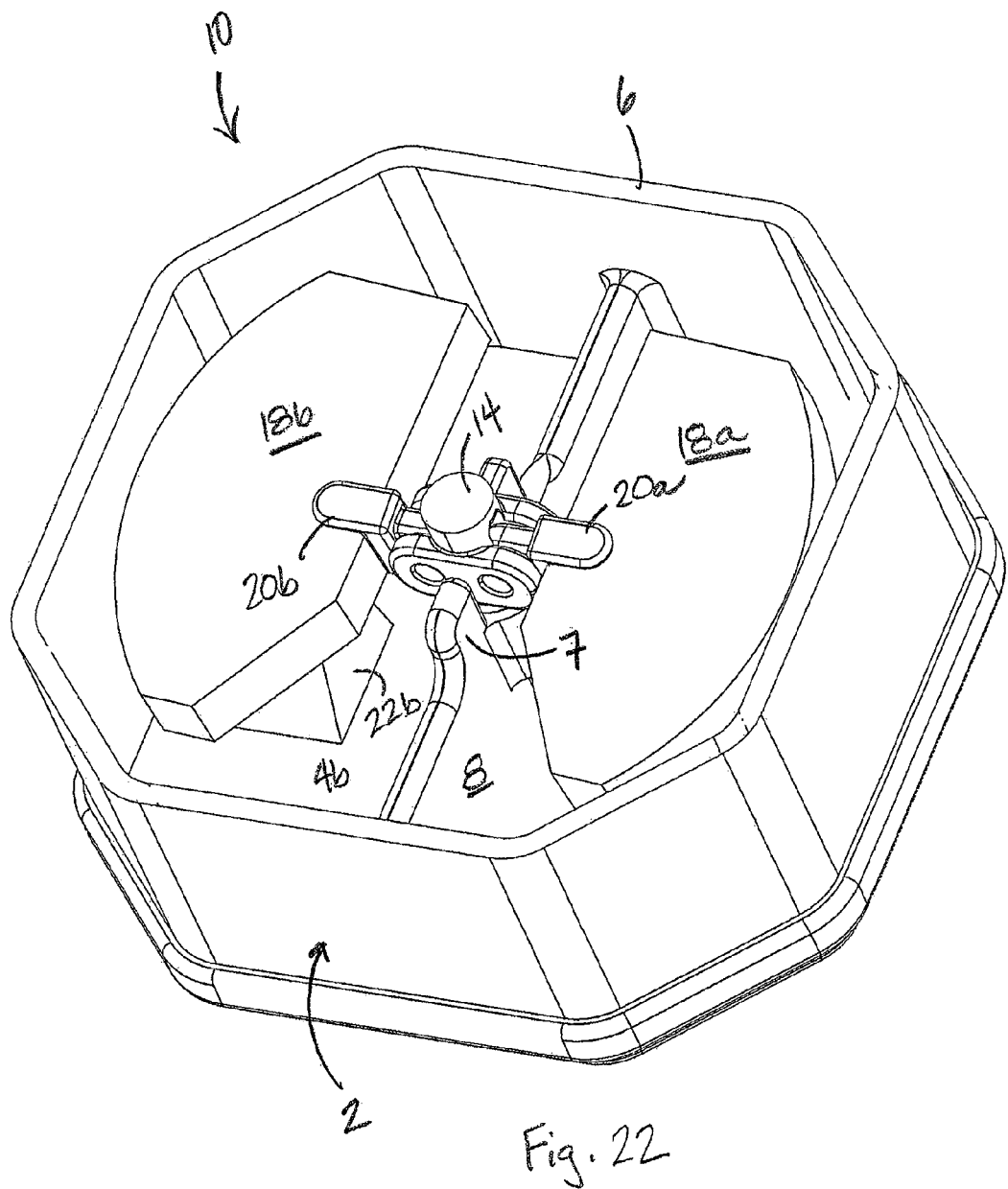
FIG. 22 is a second top perspective view of the game call.

A control handle or rotation knob 16 (or other controller) may be connected to the proximal end 14b of the support rod 14, with the control handle 16 directing rotating movement of the rotation support rod 14 engaging the cylinder 9. The control handle 16 may be any shape as desired by the user. In the illustrated embodiment, the control handle 16 has an outer perimeter defining a pair of flanges or curved extensions 17a, 17b for easy engagement by the user. The flanges 17a, 17b are positioned on opposite sides of the control handle 16 to direct the desired movement of a striker assembly 12 with respect to the corresponding striker blocks 22a, 22b. As shown in FIGS. 1 and 2, the flanges 17a, 17b may be curved in order to provide easy engagement by the user's fingers.

In addition, first and second striker plates or lids 18a, 18b are connected to opposite sides of the support rod 14 using semi-rigid or flexible connectors 20a, 20b, such as rubber torsion connecting arms. Furthermore, one or more springs 21a, 21b are connected between a connection recess 13 on the support rod 14 and respective striker plates 18a, 18b (see FIGS. 16-19). That is, in one embodiment, a single spring 21 having two arms 21a, 21b is snapped into the connection recess 13 in the central hub 14 with the two arms 21a, 21b extending out to the respective striker plates 18a, 18b. In a second embodiment, there are two separate springs 21a, 21b that are connected respectively between the support rod 14 and directly to the associated striker plate 18a, 18b. The spring or springs 21a, 21b apply a downward force F from the support rod 14 away from the control handle 16 to keep the striker plates 18a, 18b abutting and in contact with the respective sound posts 22a, 22b as described further herein. In the present embodiment, a single spring 21 having two ends 21a, 21b is affixed to the support rod 14. A pair of mounting plates 24a, 24b are connected to opposite sides of the support rod 14, with the rubber torsion arms 20a, 20b connecting respective striker plates 18a, 18b to the central hub 14. Although mounting plates 24a, 24b are shown in the attached drawings, it is noted that similar connectors, such as brackets, could be implemented in place of the mounting plates 24a, 24b. This arrangement provides for floating striker plates or heads 18a, 18b.

The striking blocks 22a, 22b are connected to respective sections 4a, 4b of the base board 4 of the housing 2, with the sections 4a, 4b of the base board 4 acting as the sound board. The bottom surface 28 of each striking block 22a, 22b is secured to the base 4 using a respective screw 5a, 5b, although other conventional means for connecting the striking blocks 22a, 22b to the base 4, such as glue, may be used as desired. The position of the striking block 22a, 22b is determined to be proximate the position of a corresponding striker plate 18a, 18b when said striker assembly 12 engages said housing assembly 2. In the embodiment illustrated in FIGS. 9, 11, and 16-23, the striking blocks 22a, 22b are substantially triangular or pyramidal shaped, with each striking block 22a, 22b having a wide bottom surface 28a, 28b and multiple walls 30a, 30b, 30c, 30d and 31a, 31b, 31c, 31d (respectively) that extend upward from the wide bottom surface 28a, 28b to a narrow edge or tip surface 32a, 32b (that is, the bottom surfaces 28a, 28b have a greater cross-sectional area than the tip surfaces 32a, 32b). It is noted from the figures that walls 30a, 30b are substantially perpendicular with the base 4, while opposing walls 30c, 31c extend to the respective tips 32a, 32b at an angle from the base 4. The tips 32a, 32b are used for selective engagement with the respective striker plates 18a, 18b.

Thus, the game call 10 includes a housing 2 that supports a centrally rotatably mounted rod 14 with the two striker plates 18a, 18b rotatably mounted to the support rod 14 at a specified angle via the rubber torsion arm 20. The striker assembly 12 of the game call 10 is inserted in the aperture 9a of the cylinder 9 of the central shaft 8, such that the mounting plates 24a, 24b will be positioned near the stop tab 7. The striker plates 18 are fixed to the support rod 14 and will rotate in the direction X1, X2 with the movement of the central shaft 14 (see FIG. 7). The striker plates 18a, 18b are also free to move in direction Y1, Y2 perpendicular to the axis of rotation X1, X2 according to the forces F applied by springs 21a, 21b and the flexibility of the torsion arms 20a, 20b. Each striker plate 18a, 18b engages respectively an individual sound post 22a, 22b via the spring force F applied by the corresponding springs 21a, 21b (see FIG. 8), with the sound posts 22a, 22b being connected to individual sound boards 4.

In operation, the user will engage one of the flanges 17a, 17b on the control handle 16 to rotate the central rod 14 in the desired direction X1 or X2. When the user engages first flange 17a in a first motion, the bottom surface 19a of the first striker plate 18a will engage the tip surface 32a of the first striking post 22a in direction X2 to generate a first sound while the second striker plate 18b will silently recover. The striker assembly 12 will rotate until the user stops the motion or the mounting plates 24a, 24b, or until connecting arms 20a, 20b engage the stop tab 7 to stop the motion. The stop tab 7 creates a natural stop for the striker assembly 12 to keep the user from rotating too far and to direct striker assembly 12 back to generate the sound of two gobblers.

Once the first motion is complete, the user will reverse the direction of rotation of the control handle 16 to generate a second sound with the second striker plate 18b in the second motion. That is, the user will engage the second flange 17b so that the second striker plate 18b will move in direction X1 and the bottom surface 19b of the second striker plate 18b will rub against the second striking post 22b and create a second sound, while the first striker plate 18a will silently recover. Again, the striker assembly 12 will rotate until the user stops the motion or the mounting plates 24a, 24b or connecting arms 20a, 20b engage the stop tab 7. As a result, the outdoorsman is able to create continuous opposition purr sounds with the first and second striker plates 18a, 18b and striking blocks 22a, 22b while utilizing only one game call 10, and these sounds can be generated by the user with a single hand. That is, the user can put the call 10 on the ground, on the user's knee, or a similar stable surface, and then use the game call 10 to call turkeys with one hand and a firearm in the other hand.

It is further to be noted that the user may apply friction-enhancing material, such as chalk or rosin, to the bottom surface 19a, 19b of the striker plates 18a, 18b as with conventional box calls. That is, since the call 10 uses friction to create sound, if or when it gets wet or out of condition, the chalk will dry the surfaces of the striker plates 18a, 18b to make the striker plates 18a, 18b vibrate at the desired level. If the striker plates 18a, 18b simply slide over the striking blocks 22a, 22b without enough friction, there will not be any sound or the pitch will change drastically, possibly creating an undesirable sound for attracting turkeys. The user may chalk the call 10 as often as is felt necessary. As with box calls, the raspier, fuller sound may come from a freshly chalked striker plates 18a, 18b. Alternatively, the surfaces may also be treated with a friction paint as a friction-enhancing material to adjust the sound generated by the striker plates 18a, 18b but that does not require the application of chalk.

Consequently, the game call 10 is designed to make the purring sound on both strokes via the rotation of a central hub 14 and a clockwise/counterclockwise input via the control handle 16. Where standard push-pull calls achieve the purring sound via spring tension in opposition to the operator depressing the push rod, the game call 10 described herein converts rotary motion into the purring sound via the semi-rigid connecting arms 20a, 20b and the compression springs 21a, 21b.

The striker plates 18a, 18b, sound boards 4a, 4b, and sound posts 22a, 22b in the illustrated embodiment may be made of wood. However, it is foreseeable that those components could be made of other materials as well, such as a resin or a metallic substance that will generate the desired sound. Furthermore, it is foreseeable that the striker assembly 12 may have a first striker plate 18a and sound post 22a made of one material while the second striker plate 18b and sound post 22b made be made of a second material to generate distinctive sounds corresponding to two fighting birds. In addition, all of the sounding components may be made of various materials to generate the desired sound to attract turkeys.

Having thus described exemplary embodiments of a FIGHTING PURR GAME CALL, it should be noted by those skilled in the art that the within disclosures are exemplary only and that various other alternatives, adaptations, and modifications may be made within the scope of this disclosure. Accordingly, the invention is not limited to the specific embodiments as illustrated herein, but is only limited by the following claims.

What is claimed is:

1. A game call for attracting animals with fighting purr sounds comprising:
    a housing assembly including:
        a base having an outer periphery,
        a wall engaging the outer periphery of said base, and a beam extending across the base of the housing between opposite sides of said wall;
    a striker assembly including:
        a central hub having a distal end and a proximal end;
        a control handle connected to said proximal end of said handle; and
        first and second striker plates connected to said central hub between said proximal end and said distal end; and
    first and second posts connected to said base on opposite sides of said beam, said first and second striker plates positioned proximate said first and second striker posts to generate fighting purr sounds when said striker assembly is moved in a first direction and a second direction.

2. The call as described in claim 1 further comprising a pair of flexible torsion arms, each torsion arm connecting one said striker plate to said central hub.

3. The call as described in claim 2 wherein each said torsion arm comprises rubber.

4. The call as described in claim 1 wherein said base comprises:
    a first base section; and
    a second base section proximate said first base section, said beam separating said first base section from said second base section.

5. The call as described in claim 1 further comprising:
    a first spring connected between said central hub and one of said striker plates to apply a force directing said striker plate into contact with one of said posts; and
    a second spring connected between said central hub and the other said striker plate to apply a force directing said other striker plate into contact with said other post.

6. The call as described in claim 1 comprising:
    a stop member extending from said beam proximate said handle to limit rotating movement of said handle.

7. The call as described in claim 6 wherein each said striking post includes a base surface mounted to the base and a tip surface opposite said base surface, said tip surface selectively engaging one corresponding striker plate to generate the desired sound, said base surface having a greater area than said tip surface.

8. A fighting purr call for attracting turkeys by a user comprising:
    a base having an outer perimeter;
    a first post and a second post each affixed to said base;
    a central hub having a proximal end and a distal end, said distal end rotatably engaging said base; and a first striker connected to said central hub, said first striker abutting said first post to generate a first sound when said central hub moves in a first direction;

a second striker connected to said central hub, said second striker abutting said second post to generate a second sound when said central hub moves in a second direction; and at least one spring positioned between said central hub and said first striker plate and said second striker plate, said at least one spring directing contact between said first striker plate and said first post and said second striker plate and said second post.

9. The call as described in claim 8 further comprising:
a controller affixed to said proximal end of said central hub opposite said base for engagement by the user.

10. The call as described in claim 8 further comprising:
a wall engaging the perimeter of said base to surround said central hub and said first post and second post.

11. The call as described in claim 8 further comprising:
a first torsion arm connecting said first striker to said central hub; and
a second torsion arm connecting said second striker to said central hub.

12. The call as described in claim 11, wherein said first torsion arm and said second torsion arm comprise a flexible material.

13. The call as described in claim 8, said at least one spring further comprising:
a first spring positioned between said first striker plate and said first hub, said first spring directing contact between said first striker plate and said first post; and
a second spring positioned between said second striker plate and said second hub, said second spring directing contact between said second striker plate and said second post.

14. The call as described in claim 8 wherein said first and second posts each include a bottom surface affixed to said base and a narrow engaging tip opposite said bottom surface, each said bottom surface having a cross-sectional area than said engaging tip.

15. A method for attracting turkeys comprising the steps of:
a) providing a call having a base and first and second striking posts engaging said base;
b) engaging a first flange extending from a knob to move said knob in a first direction, said knob connected to a central hub engaging said base so that a first striker plate connected with said central hub engages said first striking post connected with said base to generate a first sound imitating a first turkey;
c) engaging a first flange extending from said knob to move said knob in a second direction so that a second striker plate connected with said central hub engages a second post connected with said base to generate a second sound imitating a second turkey.

16. The method as described in claim 15, wherein prior to step a), including the step of:
applying a friction-enhancing material to each said bottom surface of said first and second striker plates.

17. The method as described in claim 16 further comprising the step of applying chalk to each said bottom surface of said first and second striker plates.

18. The method as described in claim 15 further comprising the steps of:
rotating said central hub in said first direction until said central hub engages a stop tab; and
rotating said central hub in said second direction until said central hub engages said stop tab.

* * * * *